No. 752,665.

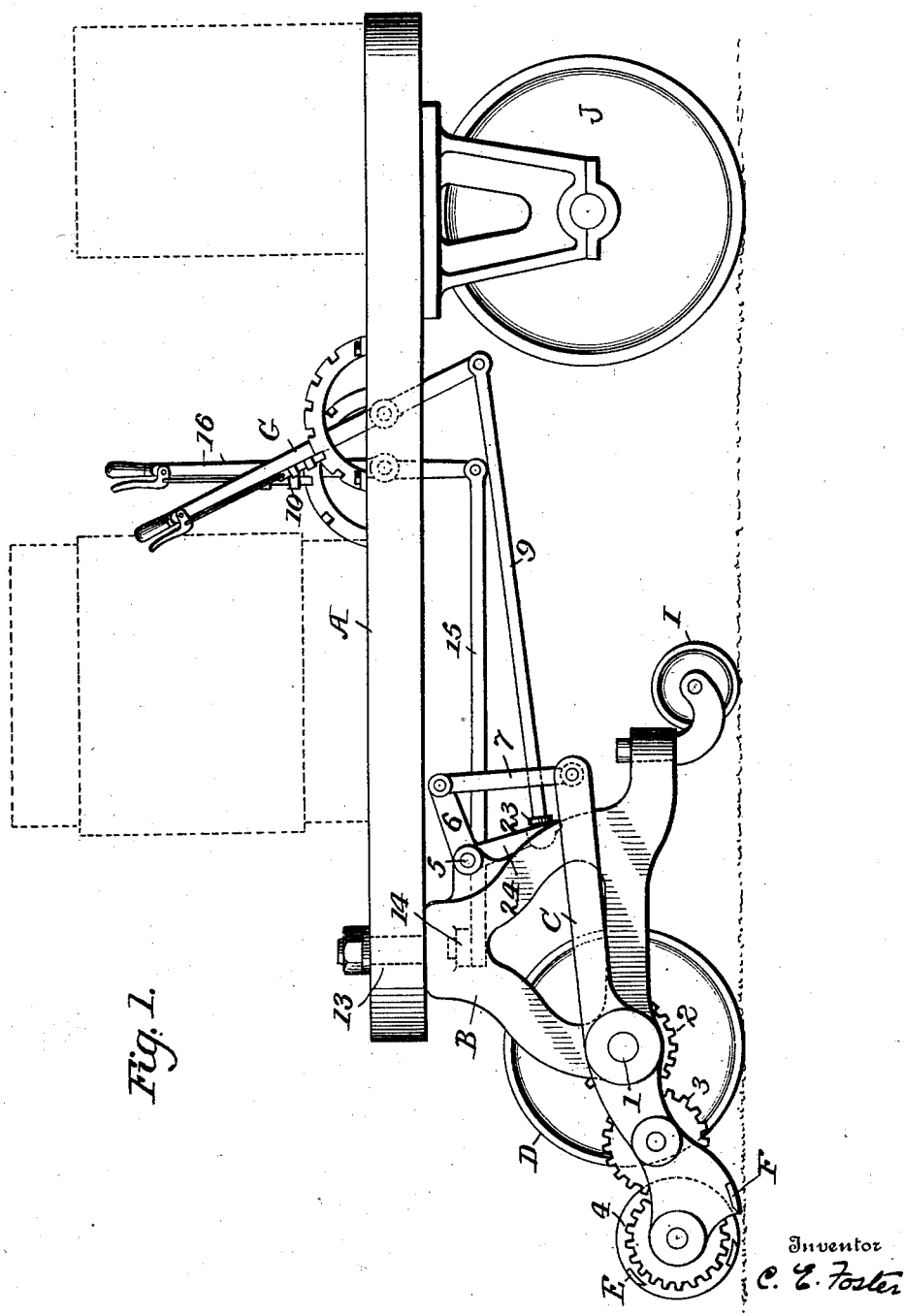

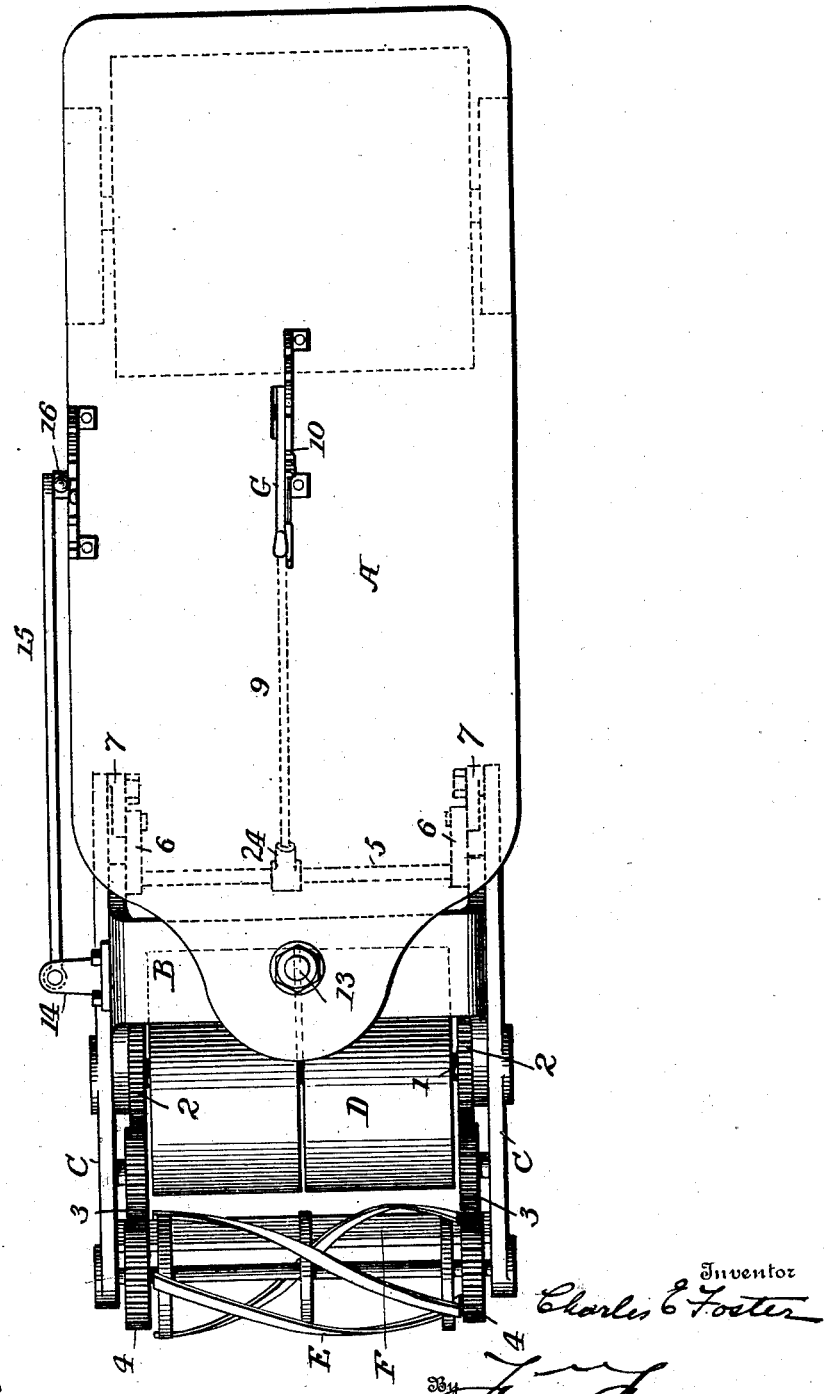

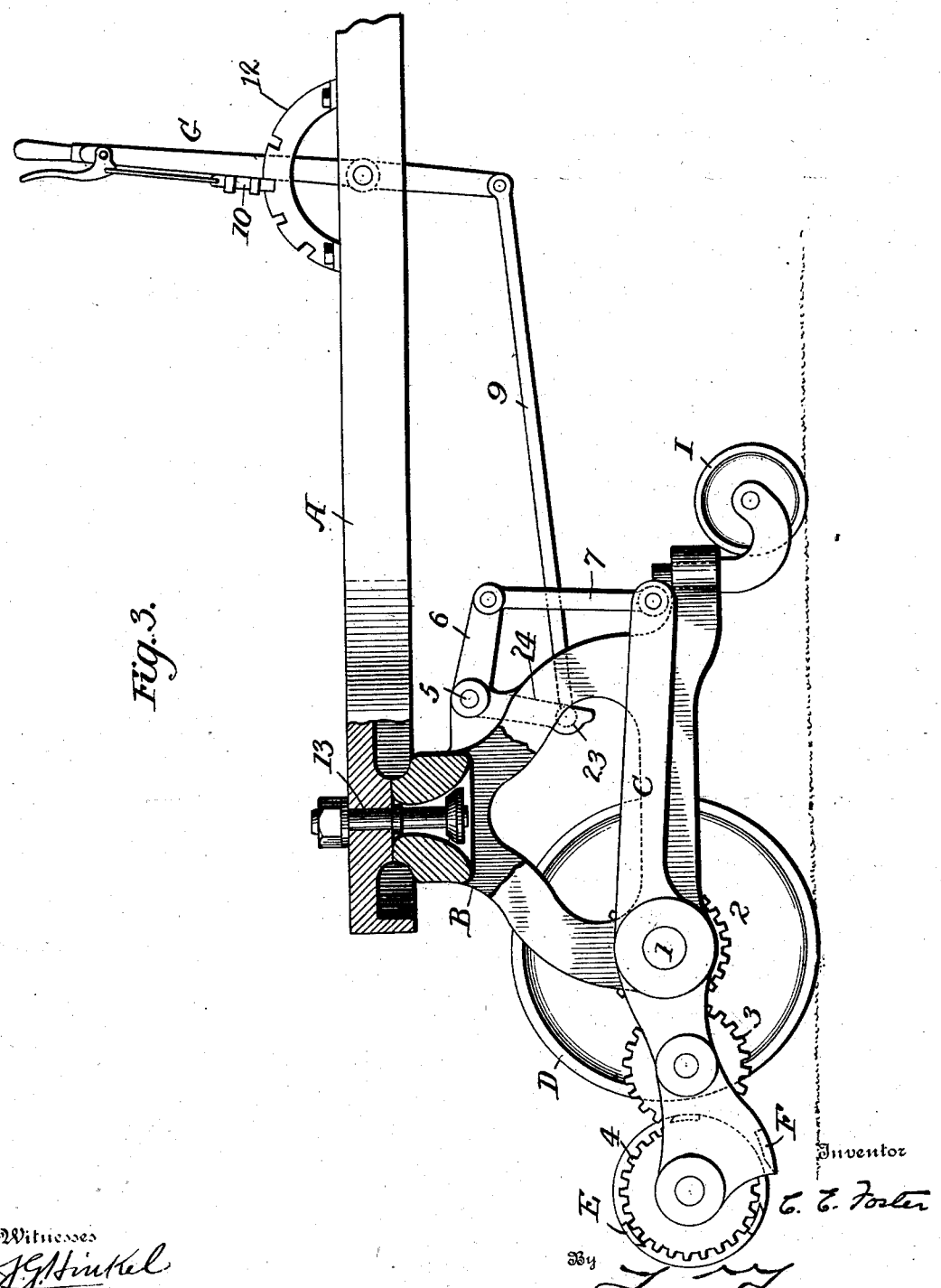

Patented February 23, 1904.

UNITED STATES PATENT OFFICE.

CHARLES E. FOSTER, OF WASHINGTON, DISTRICT OF COLUMBIA, ASSIGNOR TO WILLIAM P. SIMPSON, OF PHILADELPHIA, PENNSYLVANIA.

LAWN-MOWER.

SPECIFICATION forming part of Letters Patent No. 752,665, dated February 23, 1904.

Application filed June 23, 1902. Serial No. 112,876. (No model.)

*To all whom it may concern:*

Be it known that I, CHARLES ELWOOD FOSTER, a citizen of the United States, residing at Washington, in the District of Columbia, have invented certain new and useful Improvements in Lawn-Mowers, of which the following is a specification.

My invention relates to lawn-mowers, and especially to combined lawn mowers and rollers driven by motor devices; and my invention consists in supporting the cutting devices movably independently of the cutter-driving means, as fully set forth hereinafter and as shown in the accompanying drawings, in which—

Figure 1 is a side view of sufficient of a lawn mower and roller to illustrate my improvement. Fig. 2 is a plan of Fig. 1. Fig. 3 is an enlarged view of the forward part of the apparatus.

In the construction shown there is a main frame A and a supplemental driver-frame B, pivotally attached thereto to swing about a vertical axis, and the cutter-frame C is connected with the supplemental frame. The connection between the cutter-frame C and its supporting-frame is pivotal—that is, the cutter-frame swings on a horizontal axis, which preferably is the shaft 1 of the driving-roller D—so that by tilting the frame C on its pivot the rotary cutter E, of any suitable character, carried at the front of the frame C may be moved to or from the ground. Any suitable driving means may be employed to rotate the cutter—as, for instance, gears 2 3 4 between the shaft of the roller D and the rotary cutter—whereby the latter may be rotated to properly coact with the stationary cutter or knife F, also carried by the frame C.

It is desirable that the operator shall be able to control the position of the rotary cutter from his seat to thereby lift it when it is not desired to cut or to escape stones, &c., and I therefore provide means whereby this may be done. One such means is shown consisting of a hand-lever G, pivoted to the main frame and attached to a rod 9, which is connected by a ball-and-socket joint 23 to an arm 24 on a rock-shaft 5, turning in bearings on the frame B. Arms 6, near the ends of the shaft 5, are connected by links 7 with the rear part of the frame C. The lever G is provided with the usual hand-grip lever and bolt 10, engaging a notched segment 12. This arrangement permits the shifting of the rotating cutter without interference from the change of direction of the frame B in respect to the frame A.

The frame B is supported at the rear by swiveled or caster rollers I, so that the supplemental frame B rests constantly on its supporting-rollers, the rotary cutter-carrying frame C alone being movable. The frame B, pivoted at 13, is provided with an arm 14, connected by a rod 15 with a lever 16 or otherwise rendered capable of being swung on its pivot from the position of the operator on the main frame.

The main frame is supported in part by a lawn-roller J, and the machine is intended to be propelled by a motor, which is not shown, as it forms no part of my invention. One illustration, however, may be found in the Letters Patent to W. P. Simpson, No. 670,458, dated March 26, 1901.

I do not limit myself to the particular construction of parts shown, to any special mode of supporting the rotary cutter-carrying frame, so as to be movable independently of the frame carrying the driving-shaft, nor to the use in all cases of the supplemental frame B; but

I claim—

1. The combination with the main frame of a lawn-roller, of a supplemental frame pivoted thereto and carrying driving-roller bearings, and a cutter-frame carrying the cutters and supported wholly from the supplemental frame to swing about the axis of the roller, substantially as set forth.

2. The combination with the main frame of a lawn-roller, of a supplemental frame pivoted thereto and carrying driving-roller bearings, a cutter-frame carrying the cutters and supported wholly from the supplemental frame to swing about the axis of the roller, and connections whereby the cutters are driven from the driving-roller, substantially as set forth.

3. The combination in a combined lawn mower and roller, of a main frame, a supplemental frame pivoted thereto to swing about a vertical axis, and provided with roller-supports having a constant bearing on the ground, cutting devices, a frame carrying the cutting devices and movably connected with the supplemental frame to carry the cutting devices up and down, and means for driving the cutting devices, substantially as set forth.

4. The combination in a combined lawn mower and roller, of a main frame, a supplemental frame pivoted thereto, and provided with roller-supports having a constant bearing on the ground, cutting devices, a frame carrying the cutting devices and movably connected with the supplemental frame to carry the cutting devices up and down, and means for driving the cutting devices from one of the rollers of the supplemental frame, substantially as set forth.

In testimony whereof I have signed my name to this specification in the presence of two subscribing witnesses.

CHARLES E. FOSTER.

Witnesses:
    F. L. FREEMAN,
    H. M. GILLMAN, Jr.